United States Patent
Rinn

(10) Patent No.: US 12,547,795 B2
(45) Date of Patent: Feb. 10, 2026

(54) METHOD AND DEVICE FOR DETERMINING THE FRACTURE SAFETY OF A TREE AND ASSOCIATED COMPUTER PROGRAM PRODUCT

(71) Applicant: Frank Rinn, Heidelberg (DE)

(72) Inventor: Frank Rinn, Heidelberg (DE)

( * ) Notice: Subject to any disclaimer, the term of this patent is extended or adjusted under 35 U.S.C. 154(b) by 1025 days.

(21) Appl. No.: 17/678,505

(22) Filed: Feb. 23, 2022

(65) Prior Publication Data
US 2022/0269839 A1   Aug. 25, 2022

(30) Foreign Application Priority Data
Feb. 23, 2021   (DE) ............ 10 2021 201 706.1

(51) Int. Cl.
| G01N 29/06 | (2006.01) |
| G06F 30/20 | (2020.01) |
| G06F 111/10 | (2020.01) |

(52) U.S. Cl.
CPC .......... *G06F 30/20* (2020.01); *G06F 2111/10* (2020.01)

(58) Field of Classification Search
None
See application file for complete search history.

(56) References Cited

FOREIGN PATENT DOCUMENTS

| DE | 10032481 | A1 | | 1/2002 | |
| DE | 102014016247 | A1 | * | 5/2015 | ............ G01B 11/16 |
| DE | 102022207178 | A1 | * | 1/2024 | ............ G01B 11/16 |
| EP | 2028473 | A1 | * | 2/2009 | ............ G01N 3/40 |

OTHER PUBLICATIONS

Huang Y-S, Hsu F-L, Lee C-M, Juang J-Y. 2017. Failure mechanism of hollow tree trunks due to cross-sectional flattening.R. Soc. open sci. 4: 160972. (Year: 2017).*
Suchocka M, Jelonek T, Błaszczyk M, Wińska-Krysiak M, Kubus M, Ziemiański M, Kalaji HM. "Risk assessment of hollow-bearing trees in urban forests". Sci Rep. Dec. 14, 2023;13(1):22214. doi: 10.1038/s41598-023-49419-0. PMID: 38097704; PMCID: PMC10721860. (Year: 2023).*
Moravčík L, Vincúr R, Rózová Z. Analysis of the Static Behavior of a Single Tree on a Finite Element Model. Plants (Basel). Jun. 24, 2021;10(7):1284. doi: 10.3390/plants10071284. PMID: 34202797; PMCID: PMC8309158. (Year: 2021).*

(Continued)

*Primary Examiner* — Ayal I. Sharon
(74) *Attorney, Agent, or Firm* — Alston & Bird LLP

(57) ABSTRACT

A method is provided for determining the fracture safety of a tree. The method includes: determining a trunk cross-section of the tree to be assessed; detecting at least a largest and a smallest diameter in the trunk cross-section as well as a shape with possibly existing damages of the trunk cross-section; calculating a percentage relative direction-dependent load-bearing capacity in a plurality of definable directions via moments of resistance respectively associated with the trunk cross-section and specifically determined in accordance with anisotropy of the material, wherein, in order to calculate a respective percentage relative direction-dependent load-bearing capacity for each of the plurality of definable directions, a section modulus determined in each case in the trunk cross-section to be assessed and possibly damaged is divided by a determined section modulus of the same trunk cross-section in an assumed undamaged state; and merging the calculated relative directional load-carrying capacities.

13 Claims, 9 Drawing Sheets

(56) References Cited

OTHER PUBLICATIONS

Google Patents English Language Translation of DE102014016247A1. https://patents.google.com/patent/DE102014016247A1/en?oq=DE-102014016247-A1 (Year: 2015).*

Google Patents English Language Translation of DE102022207178A1. https://patents.google.com/patent/DE102022207178A1/en?oq=DE-102022207178-A1 (Year: 2024).*

Google Patents English Language Translation of EP-2028473-A1. https://patents.google.com/patent/EP2028473A1/en?oq=EP-2028473-A1 (Year: 2009).*

Dahle, Gregory A., Kenneth R. James, Brian Kane, Jason C. Grabosky, Andreas Detter. "A Review of Factors That Affect the Static Load-Bearing Capacity of Urban Trees". Arboriculture & Urban Forestry (AUF) May 2017, 43 (3) 89-106; DOI: 10.48044/jauf.2017.009 (Year: 2017).*

Burcham, D.C., Brazee, N.J., Marra, R.E et al. "Can sonic tomography predict loss in load-bearing capacity for trees with internal defects? A comparison of sonic tomograms with destructive measurements." Trees 33, 681-695 (2019). https://doi.org/10.1007/s00468-018-01808-z (Year: 2019).*

Rinn, Frank. "Basic Aspects of Mechanical Stability of Tree Cross-Sections". ARBORIST. Feb. 2011. https://download.rinntech.com/RINN_ArboStApp_Literature_2014.pdf (Year: 2011).*

Rinn, Frank. "Wie hohl darf ein alter Baum sein?". TASPO BaumStatik. Mar. 2013. https://download.rinntech.com/RINN_ArboStApp_Literature_2014.pdf (Year: 2013).*

Rinn, Frank. "How much crown pruning is needed for a specific wind-load reduction?". Western Arborist. Spring 2014. https://download.rinntech.com/RINN_ArboStApp_Literature_2014.pdf (Year: 2014).*

Rinn, Frank. "Shell-wall thickness and breaking safety of mature trees". Western Arborist. Fall 2013. https://download.rinntech.com/RINN_ArboStApp_Literature_2014.pdf (Year: 2013).*

Wu X, Li G, Jiao Z, Wang X. Reliability of acoustic tomography and ground-penetrating radar for tree decay detection. Appl Plant Sci. Oct. 23, 2018;6(10):e01187. doi: 10.1002/aps3.1187. PMID: 30386713; PMCID: PMC6201721. (Year: 2018).*

European Search Report for EP Application No. 22158335.4 issued Jun. 20, 2022 (7 pages).

Koizumi, Akio et al., *"Evaluation of the section modulus for tree-stem cross sections of irregular shape"*, Journal of Wood Science, Springer Singapore, Jun. 2006 (7 pages).

Burcham, Daniel C. et al., *"Can sonic tomography predict loss in load-bearing capacity for trees with internal defects? A comparison of sonic tomograms with destructive measurements,"* Trees, Springer Nature, published online Jan. 5, 2019 (15 pages).

* cited by examiner

METHOD AND DEVICE FOR DETERMINING THE FRACTURE SAFETY OF A TREE AND ASSOCIATED COMPUTER PROGRAM PRODUCT

CROSS REFERENCE TO RELATED APPLICATIONS

This application claims priority to and the benefit of German Patent Application No. 102021201706.1, filed Feb. 23, 2021; the contents of which as are hereby incorporated by reference in their entirety.

BACKGROUND

Related Field

The invention relates to a method for determining the breakage safety of tree stems.

Furthermore, the present invention relates to an apparatus for carrying out the method of determining the breaking safety of a tree stem and relates to a computer software comprising program sections for carrying out the working steps of the method.

Related Art

For various reasons, both economic and ecological, it makes sense to preserve old urban, street, garden and park trees in particular as long as possible: because of their significant contribution not only to urban biodiversity, but also to the quality of air and life. In recent years, not only a broader public but also politicians have become more aware of the manifold importance of biodiversity, so that in many countries there are now even legal, normative or official regulations to preserve mature urban trees as long as possible.

However, old trees, especially in urban environments, often have "defects", for example due to root capping, soil compaction, bark damage, unprofessional pruning or car collision damage, see FIG. 1, because often vehicles collide with trees and damage them (locally). Such damage accelerates the onset and expansion of the (albeit naturally and necessarily occurring) infestation of trees by fungi, which have the task of ultimately returning the biomass of the trees to the natural material cycle. In the forest, this is a normal process, but in the residential environment and along roads, the aforementioned damage leads to accelerated infestation and often to a premature threat to the breakage safety ("traffic safety") of the affected trees. Therefore, such damaged trees pose a corresponding risk to people and property. As soon as corresponding damage is evident, the tree owners must regularly check the "traffic safety" due to legal or normative requirements (in many countries). In each case, a decision must be made as to whether a tree can remain standing despite the developing damage, whether the crown must be reduced in order to reduce the wind load, or whether the tree must even be removed and replaced.

To assess whether a defective tree stem has a significantly increased probability of breakage, two main methods have been used internationally to date:

Since about 1993: Visual Tree Assessment ("VTA") developed mainly by Dr. Claus Mattheck, Karlsruhe/Germany.

Since approx. 1997: Statically Integrated Assessment ("SIA"), developed primarily by Dr. Lothar Wessolly, Stuttgart/Germany.

The most important VTA fracture safety criterion, which has since been applied by tens of thousands of experts worldwide, is: the quotient of the thickness of the outer intact "shell-wall" (t), usually called "residual wall thickness", and local radius (R) should be at least $\frac{1}{3}$ for "fully crowned" trees (FIG. 2) for sufficient breaking safety. If the ratio t/R is below this (t/R<$\frac{1}{3}$), measures are required, for example, to reduce the wind load.

This so-called "one-third rule" was derived from observations made mainly on existing forest trees still growing in height, i.e. relatively young trees with mostly circular trunk cross-sections and centrally located decay (FIG. 2), and then also applied to street and park trees. However, this transfer turned out to be wrong for various reasons:

In the case of a typical urban tree, this "$\frac{1}{3}$ rule" is not applicable because the lower and mostly critical trunk cross-sections are usually not circular (FIG. 3). However, because the load-bearing capacity depends primarily on the respective diameter in the direction of loading to the third power, local diameter deviations play a large, not only computationally dominant role. Thus, non-circular cross-sections behave biomechanically fundamentally different from circular ones and therefore cannot be characterized with the simplified VTA formula (t/R>$\frac{1}{3}$).

In typical street and urban trees, the fungus-induced decay are not present (as is usually the case in forestry) in the center of the cross-sections, but rather at the edges (FIG. 4)—because they are mostly caused by lateral damage to the trunk (e.g. collision damage) or to roots (capping during shaft and other ground work). For such cross-sections (which are also usually non-circular), the t/R ratio is therefore fundamentally not a measure of fracture resistance, firstly because there are hundreds of different t/R ratios depending on the angular direction, and secondly because even the lowest t/R ratio, depending on the location and other situation, does not allow any statement to be made about the load-bearing capacity of the cross-section as a whole. This can already be seen, for example, from the fact that there are countless trees with damage-related open cross-sections (i.e. with segmental t/R=0) even at high wind locations, which survive countless storms with extreme wind forces over decades, while neighboring and intact wind trees break. With segmental t/R=0, these trees are well below the "threshold" (t/R>$\frac{1}{3}$!), at least in this area, but they often prove to be safe, even against hurricanes. This shows that the t/R ratio cannot be a measure of fracture safety for this type of cross-sectional shapes and damage distribution.

Furthermore, as soon as there is a significant weakening of the mechanical bearing capacity in a cross-section and the cells located at the trunk edge are exposed to a higher load, trees form additional cells at the outer trunk edge (FIG. 5) to compensate for the mechanical bearing capacity weakening ("thigmo-morphogenesis"). This in turn changes the diameter, increases the load-bearing capacity and reduces the risk of fracture throughout the cross-section.

Finally, the so-called "age effect" as described below is not taken into account by VTA although it is highly important. In consequence, old trees can be more resistant to breakage than young intact ones, despite greater damage.

Thus, the VTA $\frac{1}{3}$ rule (t/R>$\frac{1}{3}$) is of no real help in assessing the fracture resistance of the typical mature urban street and park trees.

Also due to these deficiencies in the VTA concept, the SIA method emerged and established itself over the years as the preferred alternative among scientists and experts worldwide: in SIA, material parameters and biomechanical properties of trees (in particular E-moduli E, critical strain e, wind resistance coefficient Cw, resonance and gust factors) are used to calculate both the wind load and the load-bearing capacity of the (not only damaged) cross-sections in absolute numbers in order to determine safety factors from them:

Safety=load capacity/load

However, a technically neutral review of the SIA calculations shows that this method leads to completely nonsensical results for both young and old trees. One of the reasons for this is that the SIA uses equations established for thick-walled tubes made out of isotropic materials (e.g. aluminum). But, this leads to results away from the real load carrying capacity of defective wooden cross-sections by factors due to the highly an-isotropic material properties of wood with countless different "Poisson ratios" as explained in details by, for example, H. C. Spatz and K. J. Niklas (2013, Am. J. Bot. 100 (2): 332-336): "Modes of failure in tubular plant organs". As a result, the SIA calculations cannot in principle be a basis for a reliable evaluation of breaking safety.

Thus, VTA and SIA cannot correctly determine the fracture safety of damaged trunks of trees. Therefore, countless (especially urban) trees are unnecessarily topped, overpruned or even felled. This repeatedly leads to a considerable loss of important (not only urban) habitats and thus also of biodiversity, and furthermore to unnecessarily excessive costs and additional expenditures for tree care, so that in turn less money is available for new plantings-because if old trees are preserved as long as possible, then this is not only ecologically sensible, but it even reduces the overall costs for urban greenery.

In this respect, there is a worldwide need for a method to determine and comprehensibly assess the fracture safety of street, garden and park trees, which is not only scientifically correct, but also easy to apply, understandable and comprehensible for the persons involved in the task of tree inspection in practice. After all, these persons must not only work with such a method on a daily basis, but must also be able to document their decisions in a comprehensible manner and explain and justify them in case of doubt or accidents caused by broken tree stems.

When the following text refers to "trees", it is usually referring in particular to older street, garden and park trees, most of which are located in people's homes and living environments.

BRIEF SUMMARY

The invention described here comprises a method for determining the fracture safety of defective tree stems, as well as a corresponding device for carrying out the method and a corresponding computer program, according to which a particularly simple and reliable evaluation of the fracture safety of a defective tree stem is made possible with constructively simple means.

According to the invention, the foregoing task is solved by a method, an apparatus, and a computer program product as presented in the accompanying claims.

Thereafter, according to certain embodiments, there is provided a method for determining the resistance to breakage of a tree comprising the steps of:

Determine the trunk cross-section of the tree to be assessed (usually the most damaged one first);

Determination of at least the largest and the smallest diameter of the cross-section to evaluate, of its shape, and the location and size of any existing defects in the corresponding cross-section;

Calculating-starting from an axis running through a geometric center of gravity of the cross-section—the neutral axis—a percentage relative direction-dependent load-bearing capacity in a plurality of definable directions via moments of resistance respectively associated with the cross-section and specifically determined in accordance with anisotropy of the material, wherein, in order to calculate a respective percentage relative direction-dependent load-bearing capacity for each of the several definable directions, a moment of resistance determined in each case in the trunk cross-section to be assessed and possibly damaged is divided by a determined moment of resistance of the same trunk cross-section in an assumed undamaged state; and Merge the calculated percent relative directional bearing capacities to evaluate the fracture resistance of the tree.

Further provided according to certain embodiments is an apparatus for performing the claimed method comprising:

Detection means for detecting at least a largest and a smallest diameter of a trunk cross-section of a tree to be judged and its shape, as well as location and size of any damage to the trunk cross-section;

Calculation means for calculating—starting from an axis running through a geometric center of gravity of the trunk cross-section—the neutral axis—a percentage relative direction-dependent load-bearing capacity in a plurality of definable directions via moments of resistance respectively associated with the trunk cross-section and specifically determined in accordance with anisotropy of the material, wherein, in order to calculate a respective percentage relative direction-dependent load-bearing capacity for each of the several definable directions, a moment of resistance determined in each case in the trunk cross-section to be assessed and possibly damaged is divided by a determined moment of resistance of the same trunk cross-section in an assumed undamaged state; and Merging means for merging the calculated percent relative directional bearing capacities to evaluate the fracture resistance of the tree.

Further provided according to certain embodiments is a computer program product comprising program sections for performing steps of the method for determining the fracture safety of a tree, wherein preferably the program sections can run by means of an application software on a particularly mobile terminal.

In accordance with the invention, it has been recognized that a reliable evaluation of the fracture safety of a tree is possible on the basis of merely geometric quantities that can be easily determined or recorded (compared to all previous other methods). The recorded values with respect to the trunk cross-section of the tree cleverly form the basis for a simple estimation of a relative direction-dependent load-bearing capacity of the trunk cross-section via moments of resistance (determined by taking into account the anisotropic property of wood according to Spatz & Niklas (2013).

Complicated wind load analyses loaded with extreme error fluctuations and unavoidable imponderables as well as material investigations or determinations of material properties are not necessary for this purpose. Due to the comparative relative consideration between possibly damaged trunk cross-section and undamaged trunk cross-section by means of a division, variables that are complicated or even impossible to determine are not considered in the calculation. The calculated percentage relative direction-dependent load-bearing capacities in their synopsis lead to a safe evaluation of the relative fracture safety of the tree.

Consequently, the method according to the invention, the device according to the invention and the computer program product according to the invention provide a method, a device and a computer program product, according to which a particularly simple and reliable evaluation of the fracture safety of a tree is made possible with constructively simple means.

With regard to a particularly flexible and simple acquisition of the required measured variables, the acquisition of the largest and the smallest diameter can comprise a measurement of the largest and the smallest diameter on the tree or a procurement of the largest and the smallest diameter from a database. For example, a measurement on the tree can be made within a few minutes using a caliper.

With regard to the most comprehensive and reliable determination of fracture safety, the calculation of the load-bearing capacity can be carried out along several directions at pre-definable angular intervals along an entire circumference of the log cross-section. The smaller the angular distances, the more accurate the analysis.

In principle, the load-bearing capacity in a given direction can be calculated via moments of resistance by means of integration over a cross-sectional area of the cross-section. This is a safe and reliable method for determining the load-bearing capacity.

Particularly with regard to a reliable estimation of the fracture safety with a high safety margin, a maximum value of a direction-dependent relative-preferably percentage-weakening of the load-bearing capacity can be taken into account in the evaluation of the fracture safety in order to determine a relative residual load-bearing capacity RQT.

With regard to a particularly meaningful evaluation standard and thus a safe evaluation of the fracture safety of the tree, a basic safety of the trunk cross-section can be taken into account when evaluating the fracture safety of a trunk cross-section. In this case, the evaluation of the fracture safety is always carried out in relation to the normally existing safety of an undamaged tree, which is usually, under normal standing conditions and environmental conditions, considered to be safe. The determined safety against fracture may result in a higher safety value than the basic safety or in a lower safety value than the basic safety.

In a particularly advantageous manner and in the presence of a still undamaged trunk cross-section which, for example, does not have any rotten and/or hollow areas in the cross-section, a comparison of the trunk cross-section to be assessed with such an intact trunk cross-section on the same trunk of the tree can be made when evaluating the safety against fracture in order to determine a relative basic safety RGS. If such a relative basic safety RGS can be determined, this can be multiplied by a relative residual load-bearing capacity RQT to provide a particularly meaningful relative fracture safety.

Alternatively or additionally, a reduction of a height H and/or an age-related decrease of a height H of the tree can be taken into account when evaluating the fracture safety, whereby the fracture safety is increased in this case by the factor $(Hprevious)^3/(Hnew)^3$ and/or $(Hmax)^3/(Hactual)^3$. A reduction in height H can have been caused by, for example, pruning or age-related natural breaking of branches. The age-related (and naturally occurring) reduction in tree height occurs after typically at the end of the "exploration" growth phase, when the tree reached its maximum total height. For many trees, this process begins between 50 and 100 years of age. Both types of reduction in height contribute to an increase in fracture resistance, since wind load is primarily proportional to tree height to the third power in old trees that are critical here. Accordingly, a reduced height has a correspondingly strong effect on the currently acting wind load (for all cross-sections of the trunk).

Further alternatively or additionally, an age-related radial increase of the diameter D of the trunk cross-section of the tree can be taken into account in the evaluation of the fracture safety, whereby the fracture safety increases here by the factor $(Dactual)^3/(D_{Hmax})^3$. The trunk of each living tree grows thicker each year. Since an increase in diameter D to the third power has an effect on the increase in fracture safety, this age-related effect contributes quite significantly to the increase in fracture safety. In this respect, when this effect is taken into account, the evaluation of the fracture safety becomes even more positive, which leads to an avoidance of possibly unnecessary felling of trees that are actually still stable and are only felled due to incorrect evaluation.

In principle, it is therefore advantageous to take into account the changes over time in the quotient of $D^3/H^3$, where D is the diameter of the trunk cross-section and H is the height of the tree, when assessing or calculating the fracture safety. Ultimately, its consideration leads to a great simplification of the estimation or evaluation of the fracture safety of a tree.

This also explains the age effect: as soon as a tree has reached its maximum height (typically at an age between 50 and 100 years), the trunk diameter continues to grow as long as the tree lives and this automatically increases the break resistance every year.

BRIEF DESCRIPTION OF THE DRAWINGS

There are now various possibilities for designing and further developing the teaching of the present invention in an advantageous manner. For this purpose, reference should be made on the one hand to the subordinate claims and on the other hand to the following explanation of preferred embodiments of the teaching according to the invention with reference to the drawing. In connection with the explanation of the preferred embodiments on the basis of the drawing, generally preferred embodiments and further embodiments of the teaching are also explained. The drawing shows FIG. 1 schematic representation of a typical tree to be examined, FIG. 2 in a schematic representation of a typical log cross-section to be evaluated, FIG. 9 shows a tree damaged at the base of the trunk with intact and damaged trunk cross-sections drawn in.

DETAILED DESCRIPTION OF VARIOUS EMBODIMENTS

Figure 1:
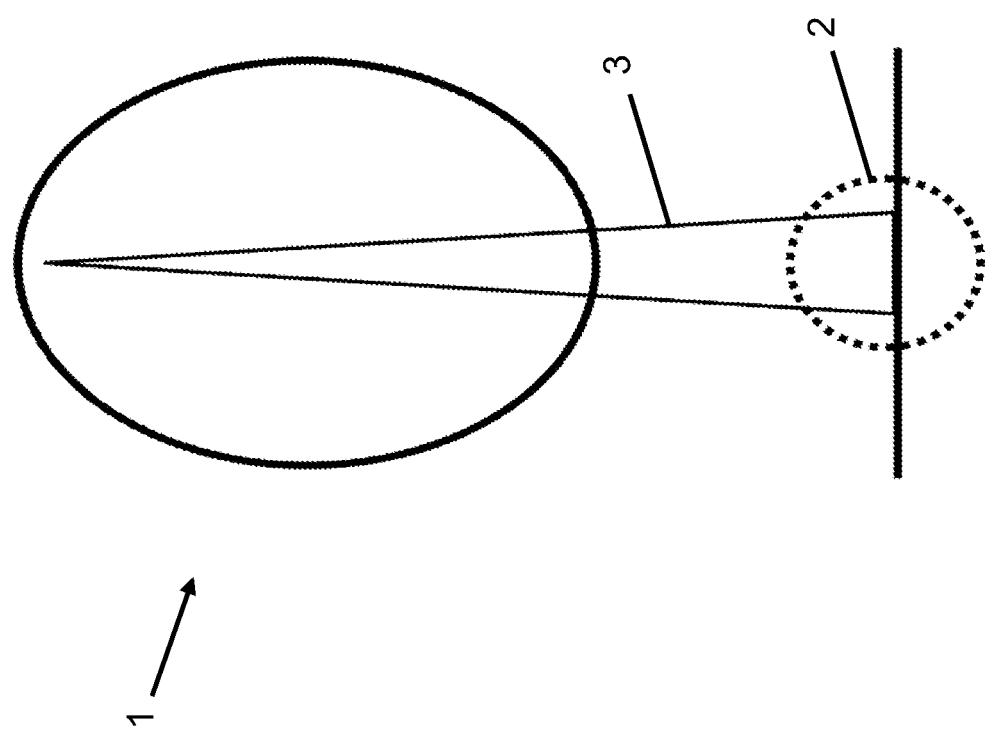

FIG. 1 shows a schematic diagram of a typical tree 1 to be examined with a trunk 3 having a trunk base 2. In the case of the mostly old and urban trees 1 to be typically examined with regard to their fracture and stability, the damage to be assessed is usually present on the lower trunk 3 and trunk base 2.

Figure 2:
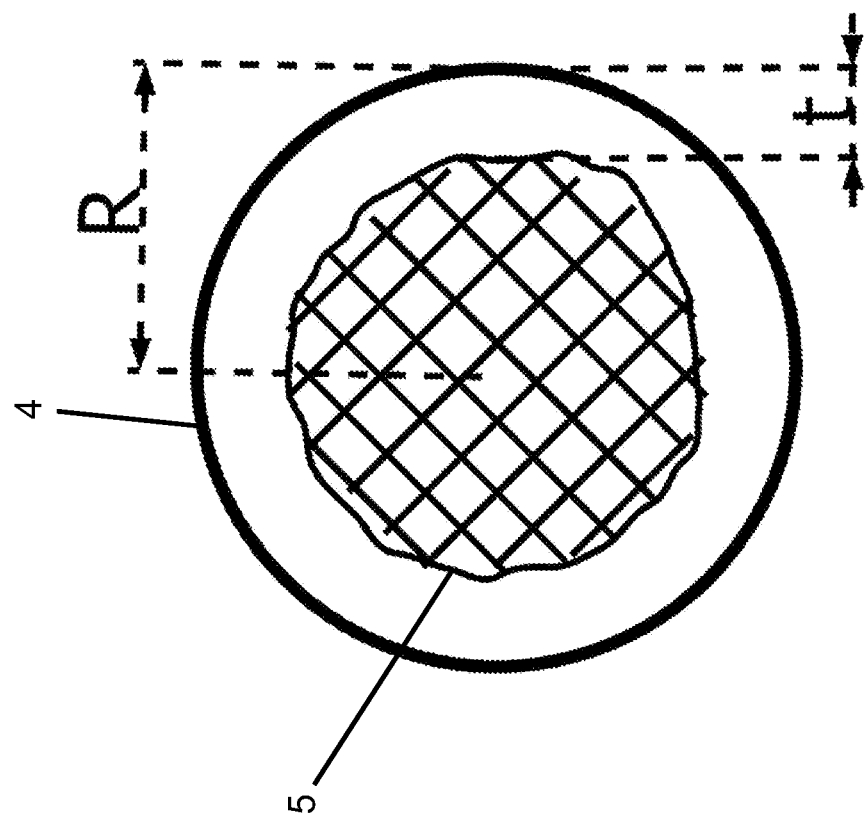

FIG. 2 shows a schematic diagram of a typical trunk cross-section 4 to be examined. According to the well-known VTA method, the quotient of the thickness of the outer intact wall t, usually called "residual wall thickness", and local radius R of "fully crowned" trees should be at least ⅓ in order to ensure sufficient fracture resistance. The trunk cross-section 4 has a damaged area 5 inside the trunk cross-section 4.

Figure 3:
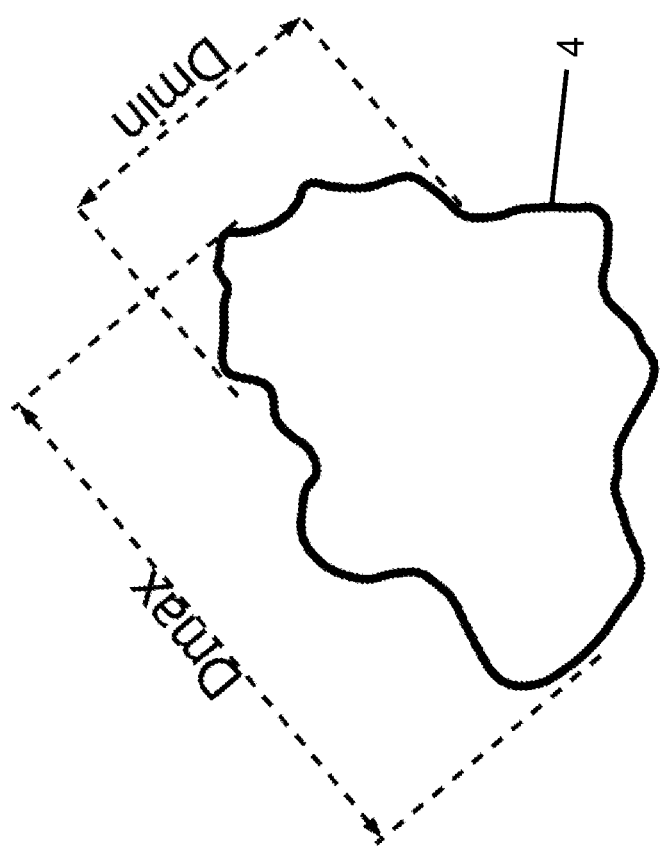
FIG. 3 shows a schematic diagram of an undamaged cross-section of the trunk of a typical urban tree, FIG. 4 in a schematic representation of a damaged trunk cross-section of a typical urban tree.

FIG. 3 shows a schematic representation of an undamaged trunk cross-section 4 of a typical urban tree. In a typical urban tree, the lower and mostly critical trunk cross-sections 4 are usually not circular, but are determined in their shape by the root runs, which in turn are shaped according to the local conditions. The largest diameter Dmax usually points in the main wind direction and the smallest diameter Dmin usually in the direction in which the lowest wind load acts on the tree.

Figure 4:
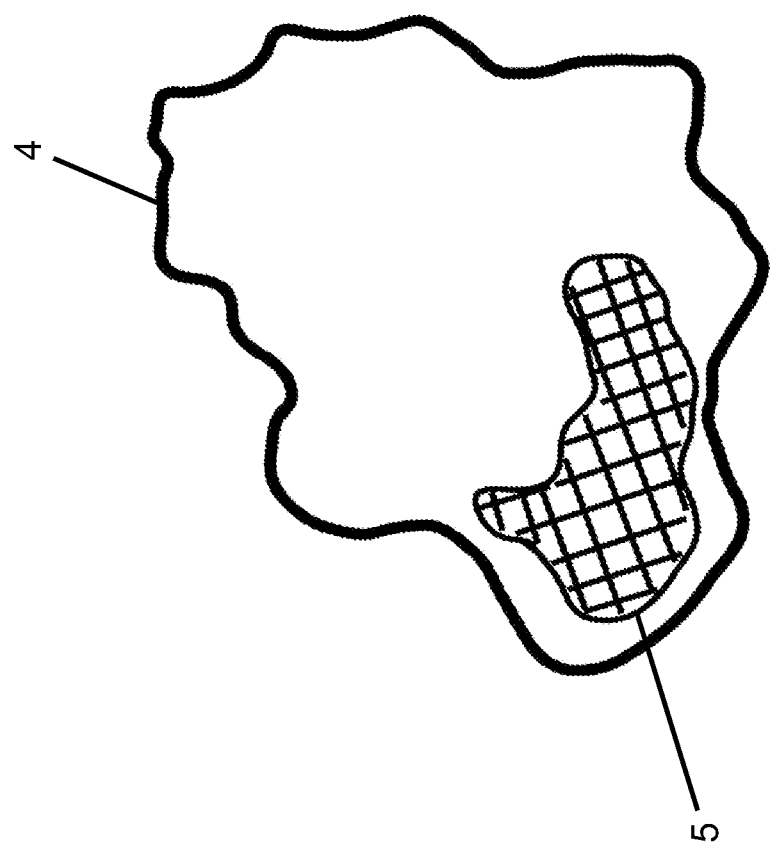

FIG. 4 shows a schematic diagram of a damaged trunk cross-section 4 of a typical urban tree with a damaged area 5. In typical street and urban trees, the fungus-induced rots are not present in the center of the cross-sections 4, as is usually the case in forestry, but rather at the edges, because they are usually caused by lateral damage to the trunk, for example collision damage, or to roots due to capping during shaft and other ground work.

Figure 5:
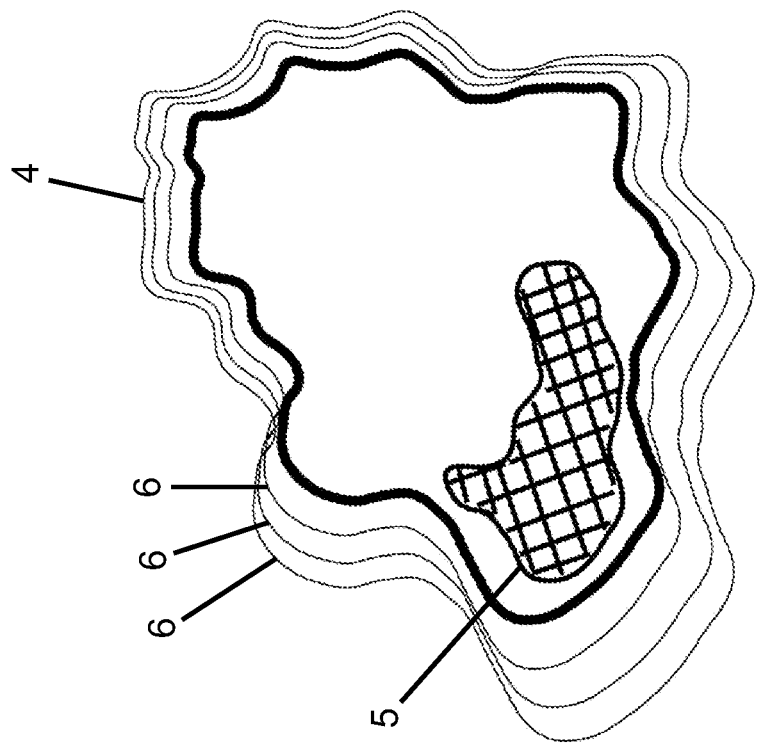
FIG. 5 shows a schematic diagram of a damaged log cross-section with annual rings corresponding to the damage, FIG. 6 in a schematic representation of a sequence of typical tree growth, FIG. 7 in a schematic representation of an angle-dependent relative load-bearing capacity around an undamaged log cross-section.

FIG. 5 shows a schematic diagram of a damaged trunk cross-section 4 with damaged area 5 and annual rings 6 corresponding to the damage. As soon as there is a significant weakening of the mechanical load-bearing capacity due to damage (cross-hatched area as damaged area 5) in a cross-section 4, the living cells ("cambium") located at the nearest trunk edge in particular are exposed to a higher mechanical load. These cambial cells respond by increasing thickness growth during the growing season to compensate for the mechanical load-bearing capacity weakening by "adaptive" growth ("thigmo-morphogenesis"). Therefore, radial annual increments, also called "growth rings" 6 in climates with a winter growth dormancy, are more pronounced in the area around damage than in more undisturbed areas of the cross-section 4.

Figure 6:
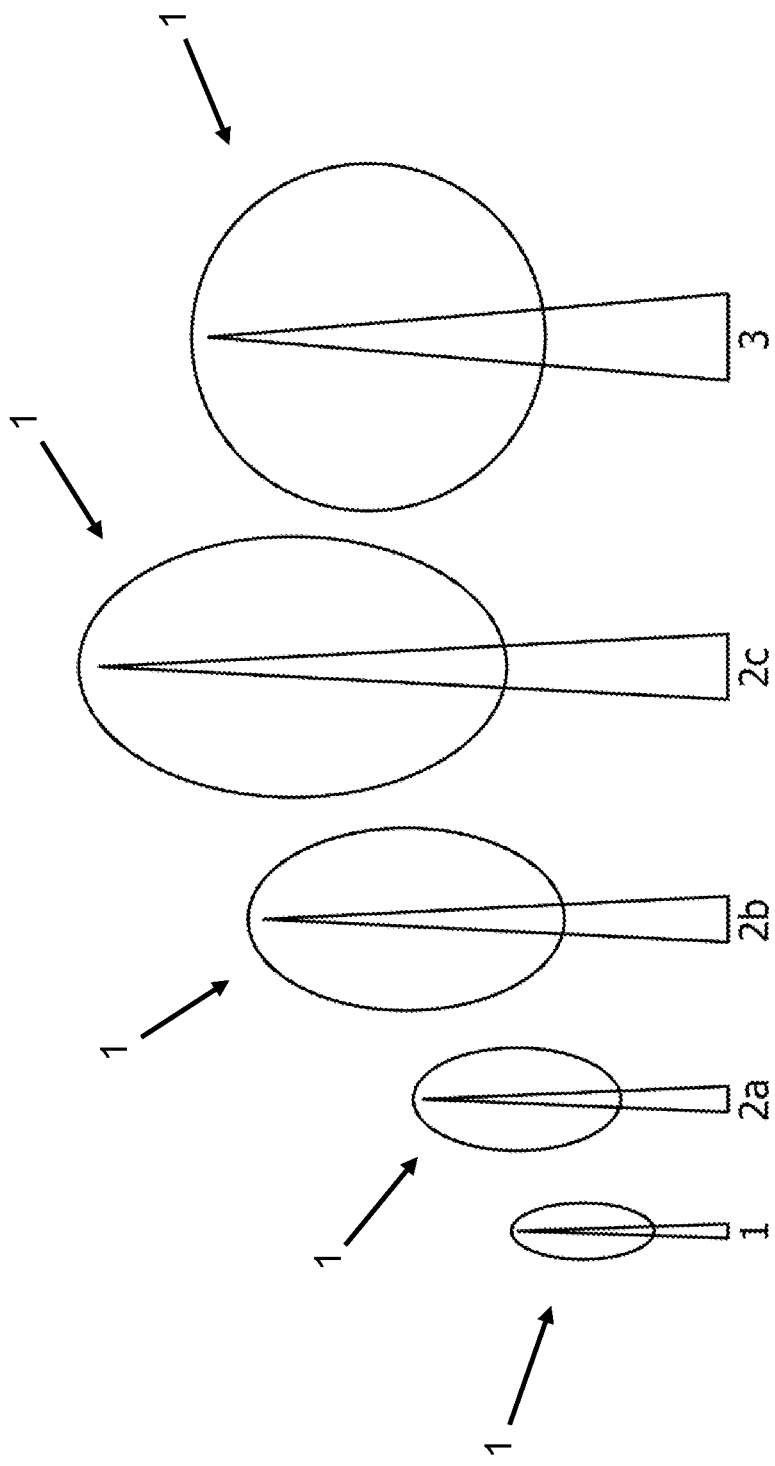

FIG. 6 shows a schematic representation of a sequence of typical tree growth. From the biomechanical point of view that is decisive here, typical urban trees 1 grow in three different booking life phases: in the first years ("juvenile phase"), trees 1 grow very quickly in height and are very slender. In the subsequent "exploration phase" (2a, 2b and 2c), the remaining trees 1 grow relatively evenly in height and trunk diameter-until they have reached their respective tree species-specific and site-typical maximum height. This is followed by a phase of varying length, depending on the tree species and location, in which the tree height remains almost constant or slowly decreases. Subsequently, trees 1 gradually become smaller as upper branches break off in the wind or are cut/capped and no such branches grow back. In many tree species, a new crown structure then gradually forms further down ("secondary crown"), to which tree 1 is also stimulated by light reaching the inside of the crown after branches have broken off, which activates buds in the bark there to sprout. This then gives rise to so-called "re-iterates", which then form a secondary and sometimes a tertiary crown. Even in this "maturity" or "ageing phase" (3), however, the trunk diameter continues to increase annually as long as the tree 1 is alive—and this has a decisive influence on the assessment of damage to such trees 1.

Figure 7:
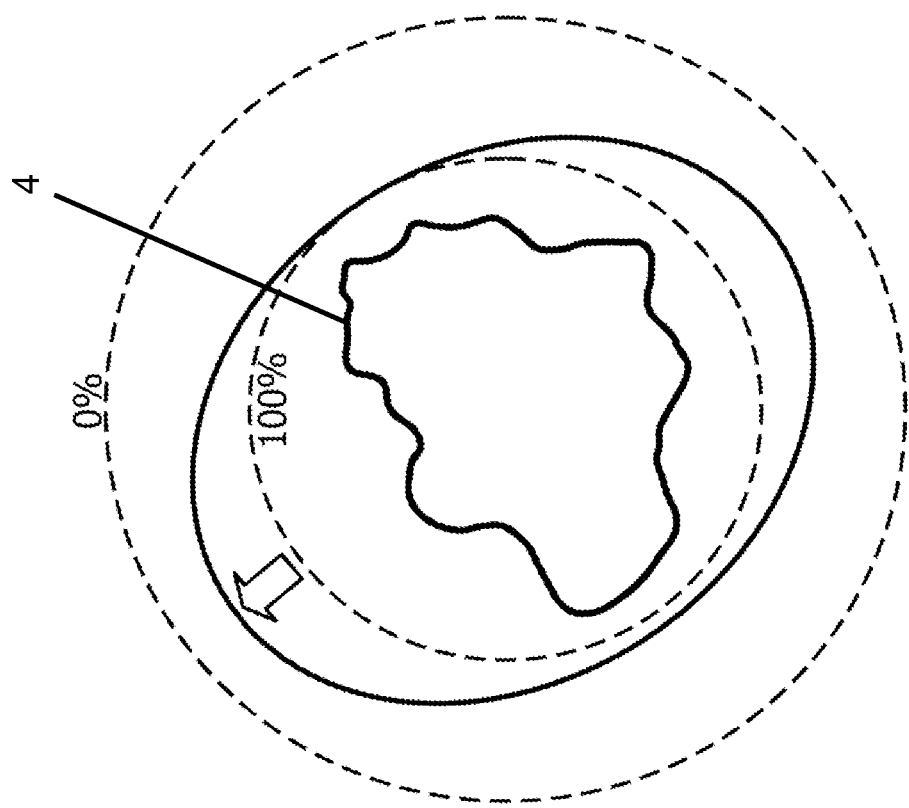

FIG. 7 shows a schematic representation of an angle-dependent relative load-carrying capacity around an undamaged log cross-section 4. The section modulus weighted for each angle (w) as a measure of the relative load-carrying capacity is shown here as a percentage curve around the cross-section 4, where in this example 100% is on the inside and 0% on the outside, so that the curve bulges most outward in the direction in which the lowest load-carrying capacity against (wind) bending load is present.

Figure 8:
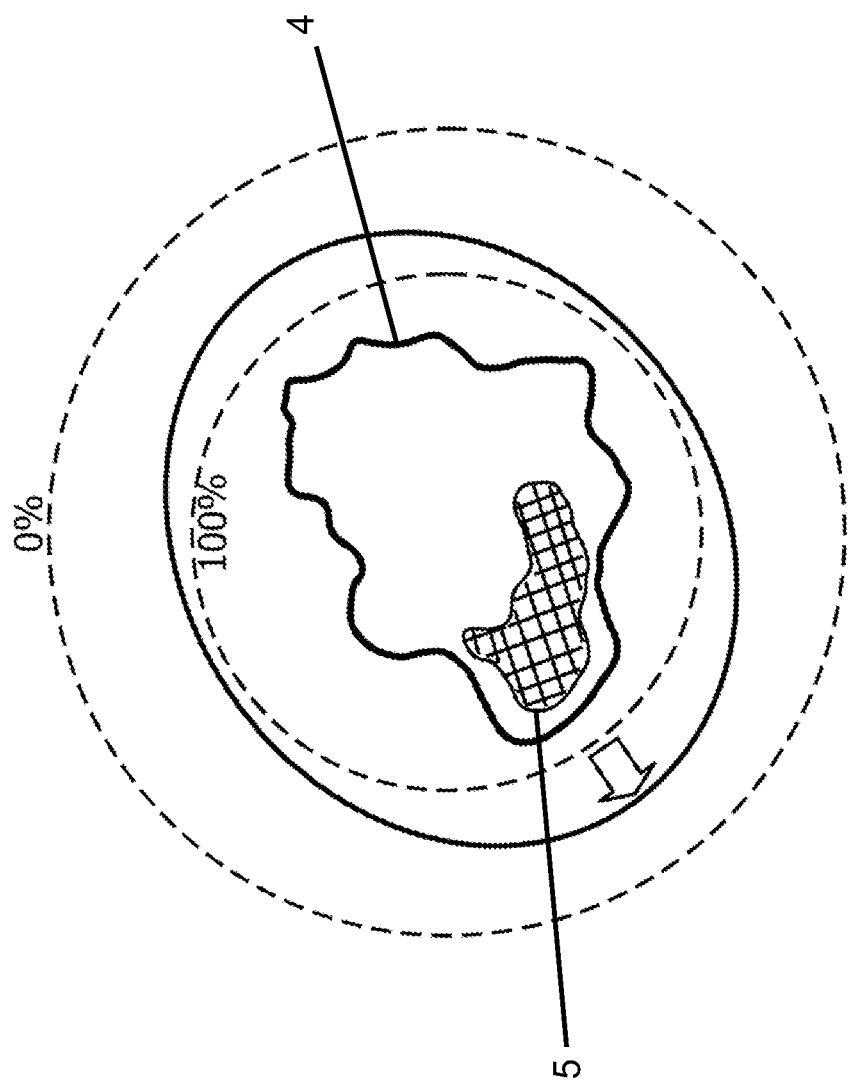
FIG. 8 shows a schematic diagram of an angle-dependent relative percentage weakening of the load-bearing capacity for a damaged cross-section of the trunk.

FIG. 8 shows a schematic representation of an angle-dependent relative percentage weakening of the load-carrying capacity for a damaged log cross-section 4. If the damaged portions of a cross-section 4 are taken into account in the calculation of the weighted section modulus and the resulting relative load-carrying capacity for each angle is divided by the value for the same cross-section 4 without damage, the result is a curve of relative (percentage) weakening shown here around cross-section 4. If the ordinate is oriented so that 100% is on the inside and 0% is on the outside, then this curve bulges outward the most where there is the most weakening. This can be additionally marked with an arrow, for example, because it is the direction that potentially has the highest probability of fracture.

Figure 9:
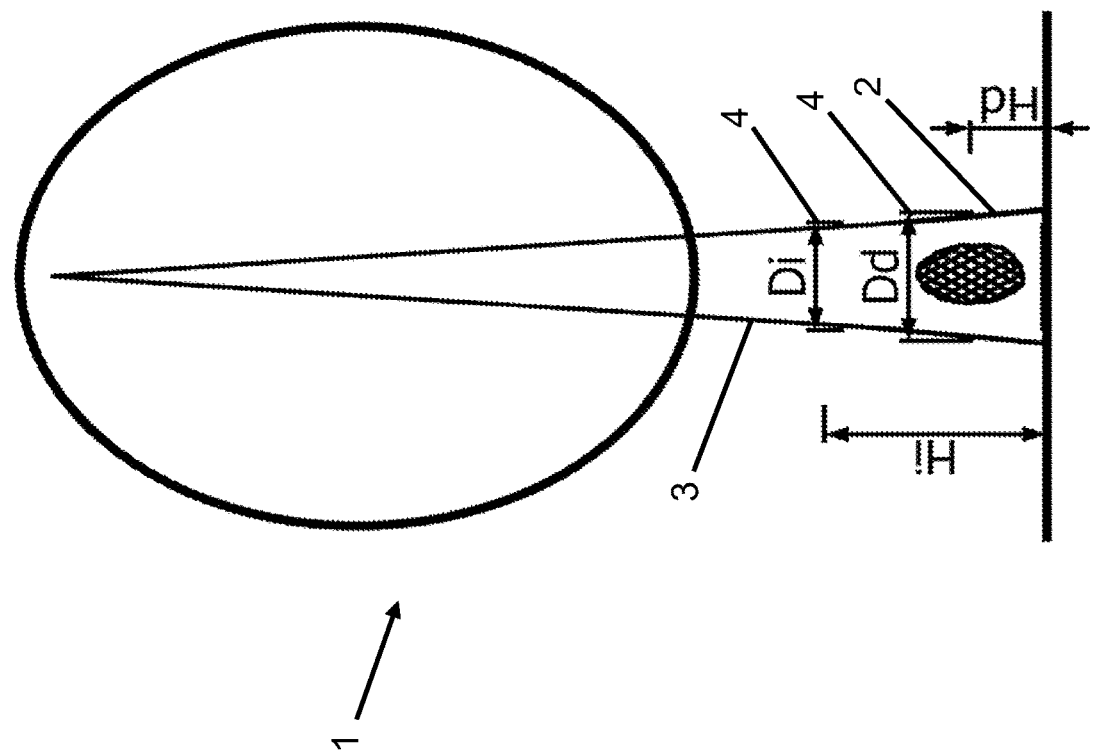

FIG. 9 shows a schematic diagram of a tree 1 damaged at the base of the trunk 2 with intact and damaged trunk cross-sections 4 drawn in. Damage at the base of the trunk 2 usually leads to an "adaptive" growth reaction in that the tree 1 forms wider annual rings in the area of the damage than on the rest of the trunk 3, which results in local thickening. To answer the question of fracture safety in this area, according to the new method presented here, essentially only geometric quantities are required: in addition to the total height H of the tree, the height of the defective—Hd—and that of the lowest intact—Hi—cross-section 4 of the trunk 3 is determined; furthermore, the maximum diameter of the damaged—Dd—cross-section and the diameter of the intact—Di—comparison cross-section are measured in the same direction.

Important Aspects of Embodiments of the Invention are Further Discussed Below

Examples of embodiments of the new method for assessing the safety against fracture, although on the one hand scientifically well-founded and comprehensible, require some mathematical operations that need a technical device for practical application. Therefore, the basic principles and calculations are explained here first, then the type of input and calculation procedure.

A central starting point of the new method is ultimately the legal boundary condition that exists similarly in many countries: the experts responsible for assessing the fracture safety of tree stems should recognize at what point a tree has a significantly increased probability of fracture due to damage compared to the (natural) "normal condition" (=intact trunk cross-sections) and then initiate appropriate action.

Because the trunks of even intact trees can break, especially during gusty and hurricane-like storms, every intact ("normal") tree also has a ("natural") probability of failure that depends on many internal and external factors. However, how high the associated safety factor (=load-bearing capacity/load) of trees is on a statistical average could only be estimated very roughly so far due to the mostly unknown boundary conditions and multifactorial, mutual (and often non-linear) dependencies. For this reason alone, the assessment of damaged trees cannot really be about determining an absolute value of the fracture safety, because with defects in the trunk, the assessment becomes even more difficult than with the intact tree.

However, the above-mentioned legal boundary condition actually makes it implicitly clear that tree safety inspection is not about determining absolute safety factors, but about relative changes: the task is, after all, to detect whether a tree (usually due to defects) has a significantly increased probability of failure compared to the "normal" (=intact) state. This already implies that it is not about the determination of absolute safety factors, but "only" about the detection of significantly increased risk of breakage—in comparison to the natural="normal"=intact condition, whose safety factor, however, has neither been determined scientifically exactly nor defined legally so far.

The new method described here now makes it possible for the first time to fulfill this legal requirement: the "normal condition" and the associated safety factor are now clearly defined here for the first time and then used as the starting point for all further observations and calculations, but without absolute determination of precisely all these values, because the calculations of the safety factors have so far always failed due to the above-mentioned, insurmountable sources of error. Therefore, the results of all previous calculation methods for tree safety are grossly incorrect and unusable.

However, in order to be able to calculate something meaningful from safety factors that are actually indeterminable, a new biomechanical growth model of trees is first required that can be described with sufficient precision, if possible, using arithmetic formulas. On the one hand, this model must clearly define the "normal condition" (here in particular with regard to the fracture safety of the trunk) and on the other hand, based on this, it must later allow the safety-relevant changes resulting from damage and other changes to be recorded and calculated. This new biomechanical model of trees, in turn, must take into account their different life and growth phases, because, for example, the established growth models of trees in forestry naturally refer to the trees and age classes that are of interest in forestry: there, the focus is particularly on the production of wood and therefore on trees that still guarantee appreciable wood growth without showing damage, that means, trees that are still relatively young.

However, it is precisely these (relatively "young") trees that are not at issue in the preservation of old-growth and habitat trees in urban environments. The preservation of damaged and, in particular, old trees has naturally not been one of the focal points of forestry research and practice in accordance with the economic constraints and forestry tasks. In recent decades, however, the importance of the highest possible biodiversity for the stability and value of mixed forest stands has also been recognized in forestry circles.

Growth Phases

As can be seen in FIG. 6, from the biomechanical point of view relevant here, most trees grow in three different life phases: in the first years ("juvenile phase"), the trees grow very quickly in height and are very slender. In nature, many young trees do not survive this phase, which usually lasts 10 to about 20 years. In the subsequent "exploration phase", the remaining trees grow relatively evenly in height and trunk diameter (the quotient H/D remains approximately constant)—until they have reached their respective tree species-specific and site-typical maximum height. After that, the total height of the trees gradually decreases as upper branches break off in the wind (or are cut/capped) and no more grow back. In some tree species, a new crown structure then even gradually forms further down ("secondary crown"). Even in this "ageing phase", however, the trunk diameter continues to increase annually as long as the tree lives—and this has a decisive influence on the evaluation of defects in such trees.

The deciduous trees common in urban environments in most countries, including the tropics and subtropics, typically reach their maximum height after about 60 to 80 years, which, depending on the tree species and location, usually ranges between 20 and 30 m, and in some cases up to about 40 m. At this point, height growth also stops in many coniferous tree species.

However, there are a few coniferous and very few deciduous tree species that grow further up in special locations and can reach heights of over 100 m. These rare exceptional cases are, however, not relevant with regard to the problem described here (traffic safety in urban environments), because this kind of tree virtually does not occur there.

The age of the specific tree to be assessed is particularly important for trees that have not grown in height for several years or even decades: because the trunks of these (old) trees also become thicker every year for as long as they live, their load-bearing capacity increases. In turn, the decreasing tree height with age leads to a reduction in wind load. In combination, this leads to a sometimes significant increase in fracture safety above the formerly natural and thus "normal" level, which is hereafter referred to as "basic safety"-because fracture safety can at the same time be reduced again by internal damage. Therefore, both aspects must be combined.

SIA also speaks of such a basic safety, but calculates it fundamentally wrong, which leads to the above-mentioned deviations from reality by factors.

New Biomechanics Model

An essential basis of the new biomechanics model is the correlation ("Thigmo-Morpho-Genesis"), which has also been scientifically proven since the 1980s, that the radial stem growth of lignified plants is primarily determined by mechanical stress:

If trees are cleared, for example by removing adjacent trees, the wind load will increase and this will cause the annual radial trunk growth to increase to compensate for the increased wind load.

When a tree is injured at the trunk (and parts of the cross-section may be degraded by fungi in subsequent years), the mechanical stress on the remaining cells increases, and this too leads to increased radial growth to compensate for the local mechanical weakening caused by the damage.

In this radial ("adaptive") growth, changes in diameter are again decisive and more important than any increase in the strength values of the newly formed wood, because, the dominant factor for the load-bearing capacity of a log cross-section is the diameter (D): for homogeneous materials, the cross-section load-bearing capacity is proportional to the strength multiplied by the diameter to the third power ($D^3$). For inhomogeneous materials, an integral must be calculated over the cross-sectional area, but even there the diameter remains the decisive factor in the end due to the third power, because all other parameters enter constant or linear.

In this respect, the diameter increment thus has the dominant influence on the load-bearing capacity of the cross-sections in several respects and can be used as a central reference measure for the load-bearing capacity in a special way described below.

The wind load acting on the trunk, in turn, is determined primarily by the tree height (H), especially for old trees, and is proportional to $H^3$, thus to H to the third power.

This dominance of the tree height is due to the fact that, on the one hand, the wind pressure is proportional to the wind speed squared and, on the other hand, the wind speed increases upwards coming from the ground, which, in combination with the lever arm becoming longer at the same time, leads to the tree height becoming the determining factor of the wind load acting at the base of the trunk.

Nevertheless, it should be borne in mind that this functional relationship between wind load and tree height to the third power is particularly true for old trees of the age phase that are largely fully grown in height or are already reducing in height. In young trees, which are still growing comparatively quickly in height, the upper branches in particular are still relatively flexible and tend to bend away as wind speed increases, so that the crown area is significantly reduced in a storm. For these trees, the above-mentioned exponent of height is not exactly 3, but slightly lower.

However, this limitation of the validity of the formulaic dependence of wind load on tree height (to the third power) is not relevant in the context described here, the assessment of fracture resistance of damaged trees, because the trees that have significant damage are usually old or very old—and there the very proportionality to height to the third power applies quite well.

Natural Model Confirmation

That this new biomechanical model reflects the most important factors sufficiently correctly is also shown by the fact that after the so-called juvenile phase (mostly the first approx. 10 to 20 years), most trees maintain an almost constant ratio of height to trunk diameter for decades:

$$H/D \approx \text{constant}$$

Why does a complex natural construction, such as trees, which is exposed to diverse static and dynamic loads, keep such a central allometric parameter as H/D constant over the decades that are most important in terms of reproduction and thus species preservation? This must have an important reason, otherwise evolutionary selection would not have caused this. Apparently, this parameter (H/D) is of such central importance that in the evolutionary development of the tree species, which has already been going on for more than 100 million years, exactly this concept has proved to be purposeful for the preservation of this plant genus—otherwise this would not be found in a similar way with almost all tree species on all continents.

If we now consider the approaches described above for characterizing (wind) load and load-bearing capacity, this relationship is explained in biomechanical terms: if $D^3$ determines the load-bearing capacity of the trunk cross-sections and $H^3$ the (wind) load, then the quotient $D^3/H^3$ characterizes the fracture safety, especially in changes over time. If trees keep the quotient H/D approximately constant in their species-related most important phase of life, then $D^3/H^3$ is also constant—and thus also the fracture safety, so that the trees thus ensure the survival of their species.

That is, that in trees typical "growth concept" (H/D≈constant in the exploration phase) proves that trees always try to ensure the best possible compromise between the most efficient reproduction (mainly depending on the height of the tree and size of the crown) and sufficient stability (mainly depending on the diameter of the trunk).

The growth concept of trees (H/D approximately constant in the exploration phase), which has been proven thousands of times in research, thus confirms the new biomechanical model described here, which can thus be used as a basis for the assessment of fracture safety.

However, it should be kept in mind that the absolute value of the H/D ratio represents a tree species-specific adaptation to the respective location and the wind loads typical there: while free-standing trees show H/D values in the range of typically rather 30 to 40, an H/D of often 70 to 90 can be found in narrow forest stands with the same tree species. The absolute value of the H/D ratio is therefore not the decisive criterion.

Important Aspect of the New Method

Thus, if each tree forms a typical H/D value at its respective location and keeps it almost constant over the decades of the exploration phase, then the quotient of $D^3/H^3$ characterizing the fracture safety is automatically given as well—and thus a reference value for the assessment of damaged trunk cross-sections that is decisive here. Because, if the intact tree with height H forms a cross-section with diameter D (and H/D is kept constant), then this quotient $D^3/H^3$ represents the natural and "normal" safety factor (SFi) of the intact tree. Experts then "only" have to recognize and judge whether the safety factor of the respective defective cross-section to be assessed (SFd) is lower or higher than the naturally given one (SFi). However, because it is not only scientifically, but above all also practically impossible to determine the safety factor on the tree exactly, especially not non-destructively, a different, completely new procedure is required: for this purpose, a relative safety factor is calculated here by dividing the safety factors of the defective (SFd) by that of the (possibly previously) intact (SFi) cross-section:

$$\text{relative safety factor} = SFr = SFd/SFi$$

The approach results in fundamental mathematical and methodological simplifications on the one hand and in orders of magnitude smaller and less influential sources of error on the other hand, as will become clear in the following and in particular also in comparison to all previous methods.

Thus, the current state of a tree is not compared with values from external reference databases or tree species-related mean value studies, but with itself. In this respect, it is a special type of "self-referencing".

The fact that the comparison with external reference data does not work is shown by the failure of the methods established so far (VTA and SIA) and becomes clear anyway if one considers the considerable variance of the material properties not only between trees of the same species in general, but also between them on the same sites and even within one tree. Such inhomogeneous and by adaptive growth to the respective local conditions adapted, complex mechanical structures like a tree differ from all other trees (like fingerprints) also because of the individually pronounced annual ring structure in each case—also because the growth and stress conditions in the reality of urban locations as well as the genetic response mechanisms are always different. The only one who knows the typical, the average, as well as extreme wind loads at a tree's location is the tree itself. Therefore, due to mechanically adaptive growth (thigmomorphogenesis) and the dominance of diameter with respect to bearing capacity, the external shape of a tree's trunk represents the sum of all previous mechanically acting influences. Better and more exactly than the tree nobody can know it. Better and more accurately than the diameter, therefore, no one indicates the load history to which the tree has been subjected up to the time of observation.

According to the invention, therefore, what is relevant for the assessment of fracture resistance is read off the tree and its externally readable shape changes: these are therefore primarily and fortunately geometric quantities, because these are comparatively easy to measure.

Components and Specific Steps in Embodiments of the New Method According to the Invention:

Cross-Section Load-Bearing Capacity

Regardless of the other boundary conditions at the tree or damaged trunk cross-section to be evaluated, it is advantageous to use a method in advance that allows the reduction in load-bearing capacity due to defects to be determined on the tree on site, if possible.

Because the diameter is the dominant factor determining the load-bearing capacity of a cross-section, and because the damaged trunk cross-sections of the trees typically to be assessed are not circular, the cross-section shape must first be at least roughly recorded and sketched: even though this is technically possible today within a few minutes by means of smartphones and 3D scanning applications, it can also be done manually by means of a forestry measuring caliper. At least the largest and smallest diameters should be recorded and the shape of the cross-section roughly sketched (FIG. 3).

This cross-section sketch initially serves as the basis for calculating the direction-dependent, relative load-carrying capacity of the cross-section via a modified section modulus (as a purely geometric quantity for preferably all load directions in each case). Since the axial section modulus is proportional to the torsional moment and only relative changes are considered here, the corresponding results on load-carrying capacity weakening due to damage apply to both types of loading at the same time: if one is reduced by 10% due to damage, so is the other. This is particularly important for the assessment of mature trees (and was not captured by previous methods) because the torsional strength of wood is often only about 10% of the tensile strength. This also explains why most real failure events in damaged old trees happen under dynamic torsional loads.

To calculate an absolute load-bearing capacity, values of the tensile, compressive and shear strengths of all surface components of the cross-section would be required in a finite element model—but because these material properties are either impossible or impossible to determine non-destructively on a standing tree, or can only be estimated very imprecisely, all methods that have attempted to determine the (absolute) load-bearing capacity in this way (and then to set it in relation to the load, e.g. due to wind or in comparison with reference data) have failed so far. In addition, for example, Young's moduli and critical strains vary greatly within a trunk even at short intervals (both radially and tangentially, and especially axially): if, for example, one walks along the trunk of an old sycamore (or similar tree species) from the base of the trunk upwards to the crown, the material parameters (Young's moduli and critical strains) that are critical for the load-bearing capacity can change not only by a few percent, but even by factors of 5 to 10.

Therefore, it is not only practically but also theoretically impossible to determine the load-bearing capacity of the different cross-sections in absolute values-without loading the tree to failure. This is another reason why the existing methods for assessing fracture safety (VTA/SIA), in which material properties are measured locally, compared with reference values and from which bending fracture strengths are derived, do not lead to reliable, often even abstrusely incorrect results when fracture safety is determined and assessed from them.

The new method described here now allows, for the first time, a calculation of the relative load-bearing capacity of a damaged cross-section for all load directions via moments of resistance (WM), often called "section modulus", without having to consider material strengths, E-moduli and critical strains. The first step to simplify the subsequent calculations is now to divide the target quantity (section modulus) by all constant factors and thus transform it into a "relative section modulus" (RWM) to be calculated for all load directions.

For this purpose, a purely geometric mathematical integration is performed over the cross-sectional area. Initially, it only requires the distance N of all load-bearing parts or area elements (x,y) of the cross-section to the respective neutral axis, i.e. to a line through the geometric center of gravity, perpendicular to the respective wind or load direction (angle w):

$$RWM(w) = \iint N^2(x,y)dxdy$$

For aluminum and similar homogeneous materials, this approach works quite well in the first order, but no longer for very thin wall thicknesses where, for example, shell buckling or tube buckling occurs. In this respect, this approach (used by SIA for the assessment of hollow trees) is also of limited use for tubes made of homogeneous material.

However, for an-isotropic materials such as wood, the material properties are very different depending on the type of loading (tension, compression, torsion, shear), which is expressed in particular in the various Poisson's ratios specific to the material and documented in the technical literature, which must accordingly be included here as a local weighting factor. This results in:

$$RWMI(w) = \iint P(x,y) * N^2(x,y)dxdy$$

The value of the specific surface moment of resistance calculated in this way is only valid for one loading (=wind) direction (w) for non-circular cross-sections, because this defines the position and orientation of the neutral axis. If now the loading direction is changed step by step and the above sum is calculated again in each case, the typically non-circular cross-sections of the trunks of old (park and street) trees usually result in a different value in each case. If now these values are determined and noted, for example, for each degree of a circle around the tree, then a list of the (relative) moments of resistance results for all these load directions. If now all values of this list are divided by the maximum value below and preferably expressed as a percentage, then a list of the percentage load capacities for all wind directions is obtained, the maximum of which for at least one value is 100, indicating the load direction against which the cross-section has the greatest (relative) load capacity. This usually corresponds to the main wind direction to which this tree is exposed.

In all other directions, the load-carrying capacity is correspondingly lower, and the minimum of the percentage values indicates the load direction with the lowest load-carrying capacity (relatively speaking). These values could now be represented as a profile over the respective load angle in an ordinary coordinate system, or preferably as a curve running around the cross section (FIG. 7). If the maximum value (100%) is on the inner circle, for example, this will cause the curve to 'bulge' most outward in the direction in which the cross-section has the lowest (relative) load-bearing capacity against wind loads due to its geometric shape, optionally additionally marked with an arrow (FIG. 7). In intact cross-sections of urban trees, this arrow usually points in the direction (w) in which wind loads rarely occur, e.g., across the street. By means of this curve of the relative bearing capacity, therefore, the local wind and thus loading conditions can usually be read off, because on the one hand the diameter growth follows the loads and on the other hand, above all, the diameter determines the mathematical section modulus. The largest diameter usually points in the main wind direction, the smallest in the direction least exposed to wind load.

From "Damage" to Weakening of Load-Bearing Capacity

If damage is now present and entered in the cross-section sketch, then each area element (x,y) must additionally be multiplied by a further "condition" factor $Z(x,y)$ during integration, which characterizes its relative local load-bearing capacity with regard to condition, for example 1 for intact wood and 0 for rotten, corresponding intermediate values for partially degraded wood. This then results in a condition—and geometry-dependent section modulus, which contains the dominant factors of the load-bearing capacity:

$$RWMD(w) = \iint Z(x,y) * P(x,y) * N^2(x,y) dx dy$$

In the simplest case of a manual, i.e. quasi-tomographic cross-section sketch, the load-bearing portions can, for example, be drawn in green (FIG. 4: outlined and not hatched) and the non-load-bearing ones in red (cross-hatched here). Then the intact surface portions can be weighted with $Z(x,y)=1$ and the damaged ones with $Z(x,y)=0$. If sonic tomography is performed, the weighting factors can also be assigned to the colors of the tomograms and calculated accordingly, for example, graded from 1 to 0, thus achieving a more precise recording of the (relative) load-bearing capacity.

Also in this way, for all the load directions considered (w, e.g. for each degree of a circle), a list of the respective moments of resistance is obtained, which is normalized by dividing all the values by the result of the previous calculation with $Z(x,y)=1$ for all (x,y): this gives a curve indicating, for each angle calculated (w=load direction), the relative weakening of the load-bearing capacity of the intact cross-section due to the damage in it (in percent).

These data could also be displayed, for example, linearly in a two-dimensional graph, but also circularly around the cross-section as a curve (FIG. 8). This makes it easier to recognize and assess the (relative!) weakening of the load-bearing capacity due to damage for all load directions, because the corresponding curve bulges out furthest to the outside, where the strongest weakening points. An arrow in this direction can facilitate the recognition of this "weakest" direction (FIG. 8).

The most important result of this analysis is therefore the relative (percentage) weakening of the bearing capacity for all load directions and, in particular, its maximum value and direction (FIG. 8)—because this is then the potentially most dangerous wind or load direction for this cross-section under consideration and must be taken into account in further considerations. The remaining (relative!) residual bearing capacity RQT is defined as 100 minus the maximum weakening in percent determined here.

Whether the percentage weakening of the bearing capacity of a cross-section determined in this way is critical, however, cannot be answered (as previous methods erroneously attempt to do) by a comparison with a reference value, but rather requires further consideration: because whether a weakening of the bearing capacity is critical also depends on how high the basic safety of the cross-section is compared to the "normal condition" described above—and thus also on whether the tree has already formed repair growth, for example, or whether the crown has been reduced, and on how old the tree is.

For example, a 20% reduction in load-bearing capacity may be critical for a tree that is still increasing in height, but completely harmless for another, much older tree, because the latter has a correspondingly much higher "basic safety".

Case Distinction

In the following, questions typically occurring in practice are distinguished depending on the concrete circumstances and boundary conditions, because for each case or aspect there are different mathematical ways for the comparative, self-referential calculation of the relative safety factor. These different methods can also be combined with each other depending on the requirements, in particular depending on which of these circumstances are given:

On the trunk, there are intact cross sections in addition to the damaged one.

The height of the tree was reduced either by pruning and/or wind breakage.

The tree is in the age phase and has not grown in height for several years.

Although the mathematical operations associated with each of these typical aspects of damaged old trees are first described individually below, they can also be combined.

Self-Referential Cross-Sectional Assessment

Trees that are still growing significantly in height, i.e. are still in the exploration phase, usually show only punctual damage (e.g. after collision damage or injuries at the base of the trunk: FIG. 9), so that there are usually still sections of the trunk with completely intact cross-sections. According to the state of the art of research and observation, as well as the growth model derived from it and described above, we can assume that the tree maintains its "normal" safety factor in an intact cross-section. Therefore, we now take this intact cross-section as a starting and reference value, because it represents the "normal" breakage safety as a reference value (but only for this tree), which is particularly important in legal proceedings. A healthy tree without defects is the 'natural' or 'normal' tree and therefore automatically has the naturally given breakage safety-which we do not know, however, because the load-bearing capacity cannot be measured without destroying the tree and because the real wind load acting on the trunk and trunk base has so far also eluded sufficiently accurate measurement.

The new concept described here now assesses damaged cross-sections of a log by comparison with the preferably lowest intact cross-section of the same log.

Because also here later only relative changes are concerned, all, in particular constant factors in the equations are not considered, because these cut themselves out anyway with the following quotient formations.

The wind load (WLi) on the intact cross-section is given in first order by the bending moment:

$$WLi = FK * Li$$

where FK=force of the wind on the crown and Li=distance from the center of force of the crown to the intact cross section.

Here, too, an integral over the entire wind attack area would normally have to be calculated for an absolute determination of the wind load, which, however, depends on many factors that cannot be determined at all, hardly or only very imprecisely (terrain roughness, wind speed height profile, wind resistance coefficients, foliage, temperature, precipitation/humidity, crown geometry/branch lengths, . . . ). The previous (SIA) methods fail due to the imponderabilities in the recording or estimation of these influencing variables, because they require or calculate absolute values of the wind load.

This is not necessary for the new method of relative evaluation described here, as will be shown hereafter, because the wind load disappears from the equations by design: the wind load at the damaged cross section (WLd) is obtained as:

$$WLd = FK * Ld$$

where Ld=distance from the center of force of the crown to the defective cross section.

The two wind loads thus differ practically only in the lengths of the lever arms (Ld to Li), because the (unknown and hardly calculable) force on the crown is identical.

The load-carrying capacities of the cross sections concerned (TF), in turn, are mainly proportional to the respective strength (Q) and to the respective diameter (D), the latter to approximately the third power:

$$TF \sim Q * D^3$$

Changes in diameter are therefore far more important and effective than the (absolute) strength values, which are in any case inhomogeneously distributed and difficult to determine, because it enters to the third power.

Previous methods also fail in this area because they determine punctual/local strength properties and infer the entire cross-section or even the entire trunk or tree from this, which, however, leads to considerable deviations between the determined and real load-bearing capacities due to the enormous natural variance in the material properties (by factors at small intervals). Therefore, a different calculation is to be made here by self-reference.

The breaking safety (BS) of a cross-section results from the quotient between the load-bearing capacity (TF) and the load (wind load WL):

$$BS = TF/WL$$

Given the functional dependencies described above, the most important proportionality is thus given by:

$$BS \sim Q * D^3 / (FK * L)$$

D=diameter of the cross section to be assessed
FK=force of the wind on the crown
L=lever arm length (distance from the center of gravity of the crown to the respective cross-section on the trunk).

For simplification, half of the tree height can also be used here, which leaves further safety in the system, because the differences in length of the lever arms thus become somewhat greater than they are in reality.

The evaluation of the fracture safety of the defective cross-section is now not to be carried out by an absolute value calculation (fracture safety/wind load) or, for example, by a determination of the quotient of residual wall thickness to radius, as was usual in previous methods, but by a comparison with an intact cross-section on the same log, in which the fracture safety of the defective cross-section is divided by that of the intact one:

$$BSd/BSi = [Qd * Dd^3/(FK * Ld)] / [Qi * Di^3/(FK * Li)]$$

Because the wind force on the crown is the same for all cross-sections on the log and the bending moments acting in each cross-section differ only by the lever arm length, a much simpler equation results:

$$BSd/BSi = [Qd * Dd^3/Ld] / [Qi * Di^3/Li]$$

Here, the wind load, which is difficult or impossible to determine anyway, is no longer present, which simplifies the mathematics accordingly and reduces sources of error. However, this equation is still "difficult" to solve due to the fact that the strength values (Q) of the two cross sections are not known and, as it were, cannot be measured with sufficient accuracy in a non-destructive manner-especially since the cross sections could not be characterized with a value for the strength anyway due to the variability of the material properties. However, all previous investigations have shown that the strength values are always higher around damage, especially in the outer, statically most important, compensatory stem radial growths, than in the other, "normal" wood of intact and undisturbed cross sections:

$$Qd > Qi$$

So when we set $$Qd = Qi$$

we virtually 'give away' some safety in the method of assessing fracture safety described here, but simplify the crucial equation considerably:

$$RGS = BSd/BSi = [Dd^3/Ld] / [Di^3/Li]$$

This is because the relative 'basic safety' (RGS) of the defective cross-section results from purely geometric values (diameters, heights) that can be determined on the tree in a few minutes-related to the fracture safety of the intact cross-section (and thus to the "normal condition" that is also important as a reference for comparison in legal proceedings). By "shortening" the strength values from the equation, one of the main, hardly determinable causes for the large error deviations of previous methods, which mostly use strength values from reference catalogs, but which are rarely or never correct on the concrete tree, especially at the concrete point to be evaluated, but can deviate by factors, disappears at the same time.

For example, if a damaged cross section due to adaptive compensation growth is 20% thicker than the intact comparison cross section of the same stem (Dd=Di*1.2) and about 10% farther from the wind force center of gravity (Ld=Li*1.1), then:

$$RGS = BSd/BSi = (1.2)^3/1.1 \approx 1.57$$

and thus an almost 60% higher 'basic safety' (not taking into account any damage).

If the damage in the wood of the defective cross-section would lead to a weakening of its mechanical load-bearing capacity by 20% (which corresponds to an already relatively large damage), then the above relative basic safety factor (RGS) would still have to be multiplied by the relative residual load-bearing capacity (RQT=0.8). Thus, under these circumstances, the relative safety against fracture (RBS) of the defective cross-section would still be well above the level of the intact cross-section:

$$RBS = RGS * RQT = 1.57 * 0.8 \approx 1.25$$

In this way, the fracture safety of a damaged cross-section can be determined and documented in a few minutes on the tree with sufficient accuracy and in a comprehensible manner—with reference to an intact cross-section of the same trunk and thus in a relative, percentage manner, without having to specify an absolute value of the fracture safety and without having to determine or estimate the influencing variables that are difficult or impossible to determine (wind load, material characteristics), because these are shortened out of the equations, so that only geometric variables that can be easily determined on the tree remain. The safety assessment thus refers to the intact, i.e. 'normal' cross-section of the same tree and thus does not require any external reference data, which can never correspond to the load and load-bearing capacity actually present on the tree anyway, because no one knows the necessary load-bearing capacities better than the tree itself, and it indicates this above all in the respective diameter of the trunk.

Altitude Effect

Since trees keep the quotient H/D approximately constant after the juvenile phase (because thus also the fracture safety $D^3/H^3$ remains approximately constant) until they have reached their maximum height and because the wind load is approximately proportional to the tree height (H) to the third power, any reduction in height (by pruning and/or by branch breakage in storms) means not only a correspondingly significant reduction in wind load, but at the same time also an increase in fracture safety by a factor of $$(H_{prev})^3/(H_{act})^3$$

where $H_{act}$ is the reduced height and $H_{prev}$ is the previous one.

From the time the tree reaches its maximum height ($H_{max}$) and its height naturally decreases slowly and gradually (if necessary, additionally by pruning), the wind load decreases accordingly, which automatically leads to a corresponding increase of the break resistance by this factor:

$$(H_{max})^3/(H_{act})^3$$

Many authorities (worldwide!) keep tree databases and record in them not only the condition but also, in particular, the trunk diameter (D) as well as the total heights (H) at the time of the respective inspections. The fact that these two geometric ("allometric") quantities are traditionally recorded is of course also due to the influence of forestry on tree care.

Therefore, there are often diameter and height data that can be used for the calculation of the "height effect" described here. If no such data are available, however, estimates can be made on the basis of experience: for most street and park tree species, it is also quite well known when they reach which maximum height, especially since this information is also provided by the nurseries, because these properties are important and must be taken into account when purchasing the tree species and variant best suited to the site.

From this point of view, the height development of virtually all urban trees that have to be assessed (due to damage) in terms of their fracture safety can either be based on measured data or by means of expert estimation in order to determine the impact on fracture safety.

Age Effect

Once a tree has reached its maximum height ($H_{max}$, $D_{Hmax}$), radial (thickness) growth of the trunk continues as long as the tree lives, because trees form a new "annual ring" every year, especially also to conduct water to the crown in it. However, because the height does not increase any more, the wind load does not increase any more either, so that with each radial diameter increase, the breaking strength of the trunk also increases:

$$(D_{act})^3/(D_{Hmax})^3$$

Again, the data contained in the tree database (diameter, height, . . . ) are helpful if this age effect is to be estimated for an old tree. If no data are available, the diameter development of a tree that has not grown in height for about 30 years, for example, can be estimated. This is because, for most tree species, it is known how the diameter develops, especially in the old age phase. In this way, the "age effect", i.e. the gain in basic safety due to the increasing diameter, can be determined.

Practical Application

Tools and Aids

In order to be able to apply the new method described here in practice, one normally first needs established "tools" such as, for example, a clap (measuring caliper for trees) and a tree height gauge in order to be able to record the external parameters (diameters and heights) required for the calculations described here; then a device into which these data can be entered and appropriately calculated with one another. What is also needed is a means of recording the shape of the cross-section to be evaluated and of producing the condition or bearing capacity tomogram, since this is the basis for calculating the relative weakening of the bearing capacity. Because the internal condition, in particular the extent of the damage, is in most cases not recognizable from the outside without technical aids, measuring devices are often used here, for example drilling resistance measurements (Rinn 1990, . . . ) and sonic tomography (Rinn 1999).

If a portable computer with preferably built-in or alternatively connectable camera as well as input possibilities for the aforementioned parameters and connection possibilities for external measuring devices is used, all these tasks can be performed with one device, which is not only much more efficient, but also minimizes sources of error during input and transmission.

With modern cameras, not only can sufficiently high-resolution photos be taken, but objects on them can also be measured with sufficient precision. In this way, tree heights and trunk diameters as well as the shape, position, orientation and dimensions of cross-sections can be recorded and documented comparatively quickly.

After entering the other parameters necessary for the calculation described here, the portable computer can calculate, display, store and transmit the individual results and the overall result.

Concrete Procedure According to an Advantageous Embodiment of the Method:

1 Cross section
   1.1 Determination of the trunk cross-section to be assessed, mostly it is about the most defective one.
   1.2 Measurement and input of at least the smallest and largest diameter of the cross-section to be assessed. The other diameters to be assessed on the tree are to be measured in the direction of the largest diameter here.
   1.3 Draw or sketch the cross-sectional shape including damaged portions and north direction.
   1.4 Calculation of the relative, direction-dependent load-bearing capacities as well as their weakening.

2 If available: Determine the height and diameter of the preferably lowest still intact cross-section of the log and enter the corresponding values.

3 Age
   3.1 Determine or estimate current age (A) of tree and enter.
   3.2 Classification of the tree in one of the relevant life phases: Exploration phase or Age phase.

3.3 If the tree is in the old/maturity phase:
   3.3.1 Enter the number of years elapsed since the maximum tree height was reached (JP).
   3.3.2 Enter diameter of trunk cross-section at time of reaching maximum tree height ($D_{Hmax}$) or calculate back from growth rate and number of years.
4 Tree height (H)
  4.1 Input of the current tree height (Ha).
  4.2 If the tree is already in the maturity phase: Enter the former greatest height (Hmax).
5 Combined calculation of the entered parameters.

Ancillary Applications:

Even though this description focuses on damage in the trunk of trees, the aspects addressed here are also applicable, at least in part, to strong branches and, in particular, to so-called "limbs". There too, for example, comparison with intact cross-sections of the same branch or stem can be made to assess damage.

For example, as soon as a tree is leaning, the weight force can contribute significantly to the load, but this is normally compensated due to the adaptive growth of the cells and therefore usually does not need to be taken into account.

Embodiments of the present invention may provide a method and apparatus for determining and/or processing data and/or parameters relating to a determination or evaluation of the fracture resistance of trees.

Finally, it should be expressly noted that the above-described embodiments serve only to discuss the claimed teaching, but do not limit it to the embodiments.

The invention claimed is:

1. Method for determining the fracture resistance of a tree trunk, said method comprising the steps of:
  determining a trunk cross-section of the tree trunk to be evaluated;
  detecting at least a largest and a smallest diameter of the trunk cross-section, and detecting its circumference, the circumference comprising any damage to the trunk cross-section;
  generating, via sonic means, a colored tomogram, to which weighting factors graded from 0 to 1 are assigned to colors of the colored tomogram;
  starting from an axis running through a geometric center of gravity of the trunk cross-section, calculating a percentage relative direction-dependent load-bearing capacity in a plurality of definable directions, via moments of resistance respectively associated with the trunk cross-section and specifically determined in accordance with anisotropy of the material, wherein, in a calculation of a respective percentage relative direction-dependent load-bearing capacity for each of the plurality of definable directions, at each trunk cross-section previously assessed as possibly damaged and assigned the weighting factors based upon the colored tomogram, a moment of resistance of trunk cross-section determined in an assumed damaged state is divided by a moment of resistance of the same trunk cross-section determined in an assumed undamaged state; and
  merging the calculated percent relative directional bearing capacities in a calculation of the fracture resistance of the tree, wherein the calculated facture resistance is at least one of displayed or transmitted, and wherein the calculated facture resistance forms the basis for deciding a topping, pruning, or felling decision for the tree (1).

2. The method according to claim 1, wherein detecting the largest and the smallest diameter comprises; measuring the largest and the smallest diameter on the cross-section, or obtaining the largest and the smallest diameter from a database.

3. The method according to claim 1, wherein the calculation of the load-bearing capacity is performed along several directions at predeterminable angular intervals, along the entire circumference of the trunk cross-section.

4. The method according to claim 1, wherein the load-bearing capacity in a respective direction is calculated via moments of resistance, comprising an integration over a cross-sectional area of the trunk cross-section.

5. The method according to claim 1, wherein the performed calculation is based, in part, upon a maximum value of a direction-dependent relative weakening of the load-bearing capacity, which is used to determine a relative residual load-bearing capacity.

6. The method according to claim 1, wherein the performed calculation is based, in part, upon a basic safety of a trunk cross-section.

7. The method according to claim 1, wherein a comparison of the trunk cross-section with an intact trunk cross-section on the same tree trunk is carried out, and used to determine a relative basic safety.

8. The method according to claim 1, wherein the fracture safety of the damaged cross-section is determined by allometrical-computational comparison with an intact cross-section of the same trunk by calculating (Li/Ld).

9. The method according to claim 1, wherein the performed calculation is further based, in part, upon a reduction of a height H and/or an age-related decrease of a height H of the tree, wherein the resistance to breakage is increased by the factor $(Hprevious)^3/(Hactual)^3$ and/or $(Hmax)^3/(Hactuat)^3$.

10. The method according to claim 1, wherein the performed calculation is further based, in part, upon an age-related radial increase in the diameter D of the trunk cross-section of the tree, wherein the resistance to fracture is increased by the factor $(Dactual)^3/(DHmax)^3$.

11. The method according to claim 1, wherein, a quotient of $D^3/H^3$ is determined in the performed calculation, wherein D is the diameter of the trunk cross section and H is the height of the tree.

12. Apparatus for carrying out the method of claim 1, said apparatus comprising:
  detection means for detecting at least a largest and a smallest diameter of a trunk cross-section to be judged of a tree, and a circumference with possibly existing damages of the trunk cross-section;
  calculation means for, starting from a neutral axis running through a geometric center of gravity of the trunk cross-section, calculating a percentage relative direction-dependent load-bearing capacity in a plurality of definable directions, via moments of resistance respectively associated with the trunk cross-section and specifically determined in accordance with anisotropy of the material, wherein, in a calculation of a respective percentage relative direction-dependent load-bearing capacity for each of the plurality of definable directions, at each trunk cross-section previously assessed as possibly damaged, a moment of resistance of the trunk cross-section determined to be in an assumed damaged state is divided by a moment of resistance of the same trunk cross-section determined to be in an assumed undamaged state; and
  merging means for merging the calculated percent relative directional bearing capacities, in a calculation of the fracture resistance of the tree.

13. A non-transitory computer-readable storage medium storing instructions that, when executed by a computer, cause the computer to carry out the steps of claim 1.

\* \* \* \* \*